United States Patent
Walker

Patent Number: 6,057,929
Date of Patent: May 2, 2000

[54] SYSTEM AND METHOD FOR PRODUCING SUBSTANTIALLY IDENTICAL DRAWING PRINTS USING DISSIMILAR PRINTING SYSTEMS

[75] Inventor: Roland J. Walker, San Bruno, Calif.

[73] Assignee: AECX Corporation, Scottsdale, Ariz.

[21] Appl. No.: 08/897,717

[22] Filed: Jul. 21, 1997

[51] Int. Cl.[7] .................................................. G06F 15/00
[52] U.S. Cl. ........................................ 358/1.15; 707/502
[58] Field of Search .................................. 395/101, 109, 395/112, 114, 500, 200.3, 200.31, 200.35, 200.47, 200.5, 200.78; 358/501, 401, 407, 408, 409, 448, 450; 707/10, 500, 505, 523, 502; 382/276, 277

[56] References Cited

U.S. PATENT DOCUMENTS

| | | |
|---|---|---|
| 4,424,572 | 1/1984 | Lorig et al. . |
| 4,654,805 | 3/1987 | Shoup, II . |
| 4,754,428 | 6/1988 | Schultz et al. ........................... 395/112 |
| 5,043,918 | 8/1991 | Murahashi . |
| 5,128,878 | 7/1992 | Gore et al. . |
| 5,319,546 | 6/1994 | Nishino .................................... 364/405 |
| 5,446,555 | 8/1995 | Fujikawa et al. . |
| 5,526,520 | 6/1996 | Krause . |
| 5,625,758 | 4/1997 | Schneider et al. . |
| 5,848,426 | 12/1998 | Wang et al. ............................. 707/505 |
| 5,857,064 | 1/1999 | deSilva .................................... 395/112 |

FOREIGN PATENT DOCUMENTS

| | | |
|---|---|---|
| 0 448 050 | 9/1991 | European Pat. Off. . |

OTHER PUBLICATIONS

"Device–Independent Soft Copy To Hard Copy Support", *IBM Technical Disclosure Bulletin*, vol. 30, No. 4, Sep. 1987, p. 1617 (author unknown).

"Method To Translate Control Codes for Different ASCII Printers", *IBM Technical Disclosure Bulletin*, vol. 28, No. 2, Jul. 1985, pp. 645–646 (author unknown).

*Primary Examiner*—Dov Popovici
*Assistant Examiner*—Gabriel I. Garcia
*Attorney, Agent, or Firm*—Wallenstein & Wagner, Ltd.

[57] ABSTRACT

A system is disclosed for producing a plurality of substantially identical prints using a plurality of dissimilar printer systems. Each of the substantially identical prints are generated from a neutral data file defining a print image and an image characteristic data file defining an attribute of the print image. The image characteristic file provides an original absolute value for specifying the attribute. The system includes a first printer system and a second printer system, both responsive to the neutral data file and the image characteristic data file for producing a first print and a second print, respectively. The attribute on the first print has a first original actual value corresponding to the original absolute value provided to the first printer system by the image characteristic data file, and the attribute on the second print has a second original actual value corresponding to the original absolute value provided to the second printer system by the image characteristic data file. The system creates a substantially similar print on the second printer system by using the systems for creating a replacement image characteristic data file for generating a second substantially similar print using the second printer system.

7 Claims, 6 Drawing Sheets

FIG. 5

| ABSOLUTE VALUES | ACTUAL VALUES |
|---|---|
| ⋮ | ⋮ |
| .001 | .0015 |
| .002 | .0026 |
| .003 | .0032 |
| .004 | .0044 |
| .005 | .0056 |
| .006 | .0066 |
| .007 | .0078 |
| ⋮ | ⋮ |

| ABSOLUTE VALUE | ACTUAL VALUE |
|---|---|
| ⋮ | ⋮ |
| .001 | .00095 |
| .002 | .0019 |
| .003 | .0023 |
| .004 | .0038 |
| .005 | .0046 |
| .006 | .0057 |
| .007 | .0078 |
| ⋮ | ⋮ |

FIG. 6

| | ORIGINAL ABSOLUTE VALUE | FIRST ACTUAL VALUE | SECOND ACTUAL VALUE |
|---|---|---|---|
| | — | — | — |
| | — | — | — |
| | — | — | — |
| | — | — | — |
| | — | — | — |
| | — | — | — |
| | — | — | — |
| | — | — | — |
| | — | — | — |
| | — | — | — |
| | — | — | — |
| | . | . | . |
| | . | . | . |
| | . | . | . |

TEMPORARY TABLE

SYSTEM AND METHOD FOR PRODUCING SUBSTANTIALLY IDENTICAL DRAWING PRINTS USING DISSIMILAR PRINTING SYSTEMS

DESCRIPTION

1. Technical Field

The present invention relates to a system that prints substantially identical drawings, such as architectural or engineering drawings, using dissimilar printing systems.

2. Background of the Invention

Typically, architects work with engineering firms, contractors, subcontractors, developers and others to complete a project. The architect must provide each party with drawing prints to perform its contracted work. As plans are repeatedly changed and modified, many sets of drawing prints must be sent to each party. Since each party relies on architectural and engineering drawings to perform its part of a project, it is critical that the drawing prints sent to each party be substantially identical, according to the architect's specifications. Often these various parties live in remote geographical areas, requiring that drawing prints be sent by a commercial carrier to each party.

Historically, architects have formed strong business relationships with a local "reprographer," who's job is to produce the architect's drawings prints. These relationships rely heavily on the local reprographer having the expertise required to produce plans that look exactly as the architect wants. The ability to produce such output is not necessarily a given, because there exists a wide range of different types of plotting environments used by architects to create graphic source files and also a complete range of output device environments at reprographers' shops. Input values are not necessarily easily translatable across output device platforms for large format printers/plotters.

In addition to producing prints for the architect, the reprographer commonly is responsible for producing drawing print copies and sending them to each party involved in a project. Typically drawings are sent using a package carrier, causing at minimum an overnight delay in receiving the drawings and incurring delivery charges. One approach to avoiding the delay and costs involved by shipping drawing prints via a third party carrier is to transmit drawings electronically.

U.S. Pat. No. 5,446,555, issued to Fujikawa et al. on Aug. 29, 1995 (hereinafter, "Fujikawa"), assigned to Nippon Steel Corporation, discloses a system for transmitting drawing prints electronically to remote locations. Fujikawa operates analogously to a facsimile machine, by scanning a recorded sheet and then transmitting the electronic image to another location. The system disclosed by Fujikawa is comprised of an image reading means for reading the design drawing drafted on a recorded sheet, a transmission means for transmitting drawing information, a design drawing receiving device having receiving means for receiving the drawing information, and output means for reading out the drawing information and reproducing the design drawing on a recorded sheet. According to Fujikawa, a drawing must initially be produced on a recorded sheet using a plotter. Only by electronically imaging the physical, recorded sheet using an electronic scanner is an electronic image signal created. The electronic image signal is then transmitted and received by a second location. Finally, the image signal is reproduced on a second plotter.

While Fujikawa discloses the importance of reproducing identical drawings on the receiving side, Fujikawa discloses a system for accomplishing this goal by merely adjusting the resolution of the entire transmitted image print as a whole. Fujikawa does not disclose a system for individually adjusting each image characteristic of a drawing image represented by an electronic data file.

The present invention is provided to solve this and other problems.

SUMMARY OF THE INVENTION

It is an object of the invention to provide a system for producing a plurality of substantially identical prints using a plurality of dissimilar printer systems.

In accordance with the invention, each of the substantially identical prints are generated from a neutral data file defining a print image and an image characteristic data file defining an attribute of the print image. The image characteristic file provides an original absolute value specifying the attribute.

The system is comprised of a first printer system responsive to the neutral data file and the image characteristic data file for producing a first print. The attribute on the first print has a first original actual value corresponding to the original absolute value provided to the first printer system by the image characteristic data file.

The system also includes a second printer system responsive to the neutral data file and the image characteristic data file for producing a second print. The desired characteristic on the second print has a second original actual value corresponding to the original absolute value provided to the second printer system by the image characteristic data file.

Finally, the system includes means for creating a replacement image characteristic data file for generating a second substantially similar print using the second printer system. The replacement image characteristic data file providing, instead of the original absolute value, a second absolute value.

Other features and advantages of the invention will be apparent from the following specification taken in conjunction with the following drawings.

BRIEF DESCRIPTION OF THE DRAWINGS

FIG. 5 illustrates representations of data tables that are used in the present invention; and FIG. 6 illustrates a representation of another data table used by the present invention.

DETAILED DESCRIPTION OF THE PREFERRED EMBODIMENT

Figure 1:
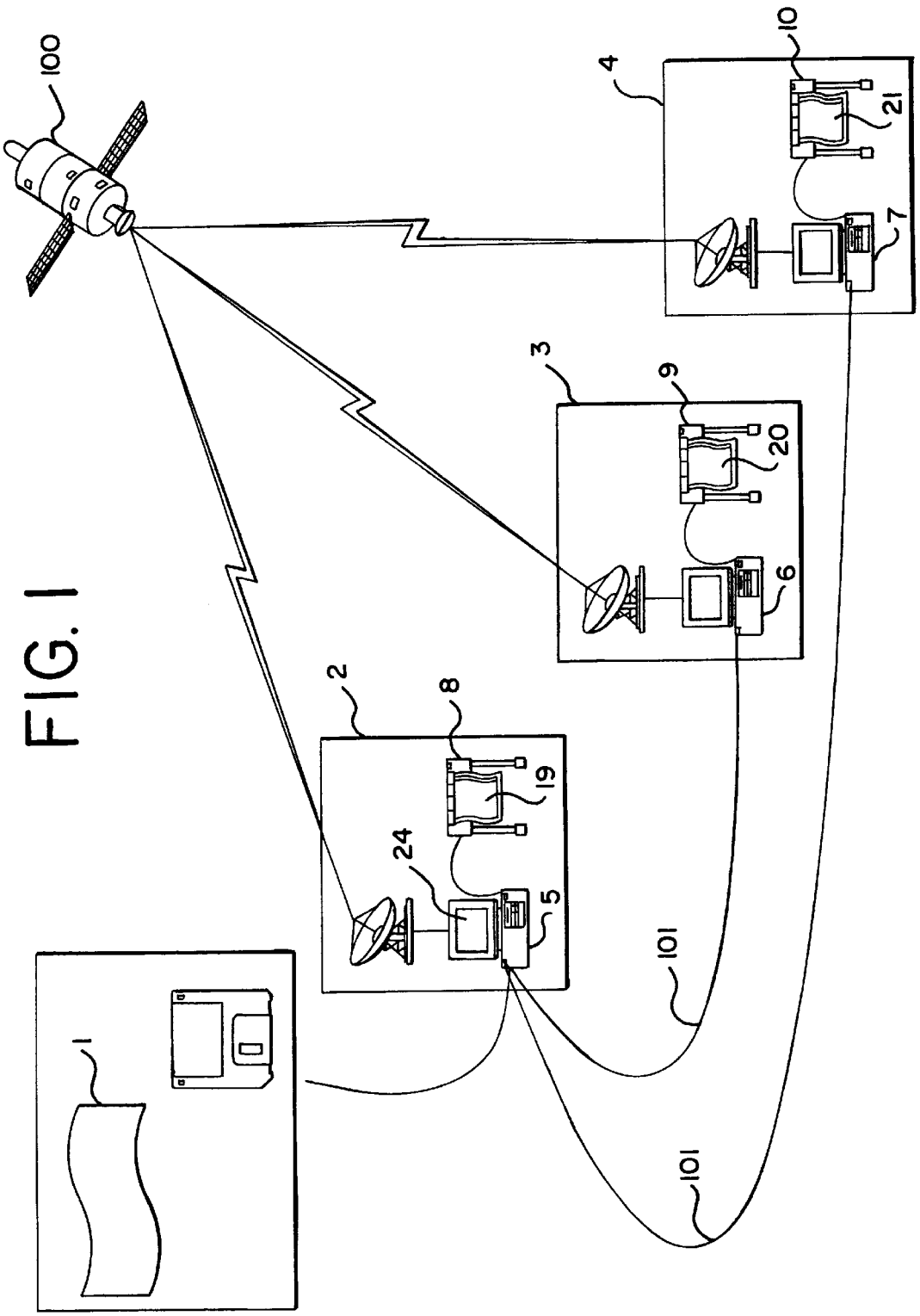
FIG. 1 illustrates a network of reprographer sites having dissimilar printing systems.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

As shown in FIG. 1, the present invention electronically distributes one or more drawing print(s) 1 to multiple geographic locations 2,3,4. The invention is embodied by a software program designed to be used by a plurality of participating reprographers, each residing in a remote geographic area. The system is designed to run off a computer 5,6,7 located at each respective location 2,3,4 that is integrated with each reprographer's printer hardware 8,9,10 either directly or via a computer network (not shown). The system software is navigated by the reprographers 2,3,4 through easy to use graphical interfaces. The system functions are driven by "drag-and-click" commands using a mouse.

The system produces a plurality of substantially identical prints using a plurality of dissimilar printer systems, which allows the participating reprographers 2,3,4 to use any of a variety of printer systems. Printer systems are defined by the type of the printing or plotting hardware 8,9,10 (make and model) and the type of software (not shown) on the computers 5,6,7 used to drive the hardware. Hardware supported by the preferred embodiment include "Océ 9800," and "Océ 9400," made by Océ Company, 5450 North Cumberland Avenue, Chicago, Ill. 60656, and "Xerox 8845," and "Xerox 8855," made by Xerox, 5853 Rue Ferrari, San Jose, Calif. 95151-0061. The preferred embodiment supports the following digital printing software applications: PageMasters' Apprentice, by PageMasters, 3636 N. Central Avenue, Phoenix, Ariz. 85012 and Precision Laser Plotting (PLP) Plot Works, by PLP Digital Reprographic, Inc., 6060 Thomas Road, Scottdale, Ariz. 85251. Of course, the invention may be easily adapted to support other hardware and software.

The system and method will now be described with reference to one particular local reprographer's site 2 and another remote site 3. To distribute a drawing print 1 to one or more remote locations, first an architect electronically transmits or physically delivers a representation of a desired print image to a local reprographer 2 as shown in step 11 of FIG. 2. Referring to FIG. 3, the desired print image is represented by two data files: (1) a drawing file 17, which is in a format determined by the architect's chosen drafting software; and, (2) a related, pen set file 18, which will be referred to as an image characteristic data file 18. The drawing file 17 contains the information defining the image. The image characteristic data file 18 defines attributes of the image defined by the drawing file 17, such as line widths and shading patterns.

The file format of the drawing file 17 and the image characteristic data file 18 vary according to, and are determined by, the architect's drafting software and the printer system that generates the prints. To provide greater uniformity, the present invention initially converts the drawing file to a neutral data file format, as indicated by step 12, in FIG. 2. In the preferred embodiment, the neutral data file is created using the Page Masters Apprentice Software Program, although several other commercially available programs could be used to create a neutral data file. Accordingly, the system converts the drawing file format to the Page Masters Apprentice file format. Page Masters Apprentice files are denoted by a VIC file extension. While the .VIC extension is used on the preferred embodiment, the extension is arbitrary and may be easily changed, for example, .AEC could be used. The conversion of the drawing file to the neutral format is transparent to the reprographer.

Figure 4:
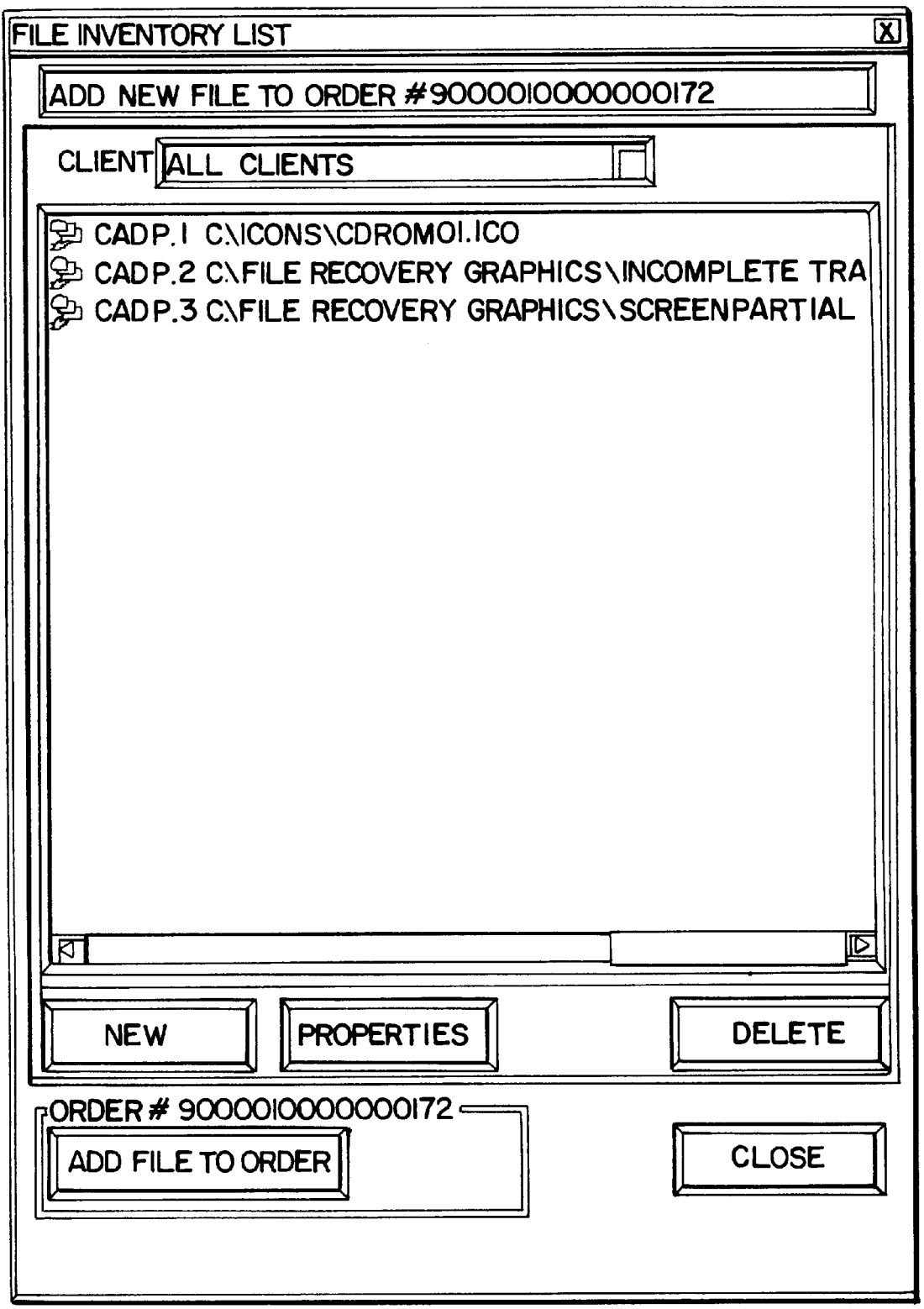
FIG. 4 illustrates an order entry computer screen provided by the preferred embodiment of the present invention.

Certain commercially available drafting software programs provide the capability of linking separate drawing data files, referred to as "drawing dependencies", to the main drawing. Also, some software programs provide drawing setting data files that store printing information according to user preference, such as the size and type of paper to use, the size of the drawing, and other criteria. Upon initiating the system software, the reprographer is presented with an order entry screen, FIG. 4. The order screen prompts the reprographer to select the drawing files 17, image characteristic data file 18 (i.e., pen sets), drawing dependencies (not shown), and drawing settings (not shown) to be printed by another printer system. Once the reprographer selects the desired files, the neutral data file is created using an Application Programmer Interface (API) created by Page Masters in a format having a .VIC (or other) file extension, as described above. Like the drawing file 17, the neutral data file is operable with the image characteristic data file 18 to produce a print 19,20,21.

For every line or pattern included in the drawing file 17 (and subsequently in the neutral data file), the image characteristic data file 18 contains an absolute value 22, referred to herein as an original absolute value 22, that defines an attribute, i.e., the line's thickness or the pattern's appearance. Typically, the image characteristic data file will contain a plurality, usually hundreds, of original absolute values 22. When a print is created, the original absolute value produces an actual value 23 for the attribute, i.e., the actual line thickness, on the print. Although an absolute value provided to a printing system 2,3,4 may approximate the resulting actual line thickness or pattern appearing on a resulting drawing print, a given absolute value will produce different results on different printing systems 2,3,4. In other words, dissimilar printing systems 2,3,4 using the same neutral data file and image characteristic data file 18 will produce dissimilar prints 19,20,21. The invention compensates for and corrects the variation inherently produced by dissimilar printer systems 2,3,4.

The present invention includes a first printer system 2, typically at the transmitting reprographer's location, responsive to the neutral data file and the image characteristic data file 18 for producing a first print 19. Referring to FIG. 3, when the first print 19 is produced using the first printer system 2, the attribute will result in a first original actual value 23. The first original actual value 23 corresponds to the original absolute value 22 provided to the first printer system 2 by the image characteristic data file 18. So, for example, if the original absolute value 22 for a particular line is 0.001" thick, the resulting line may instead actually measure 0.0015" thick.

Figure 2:
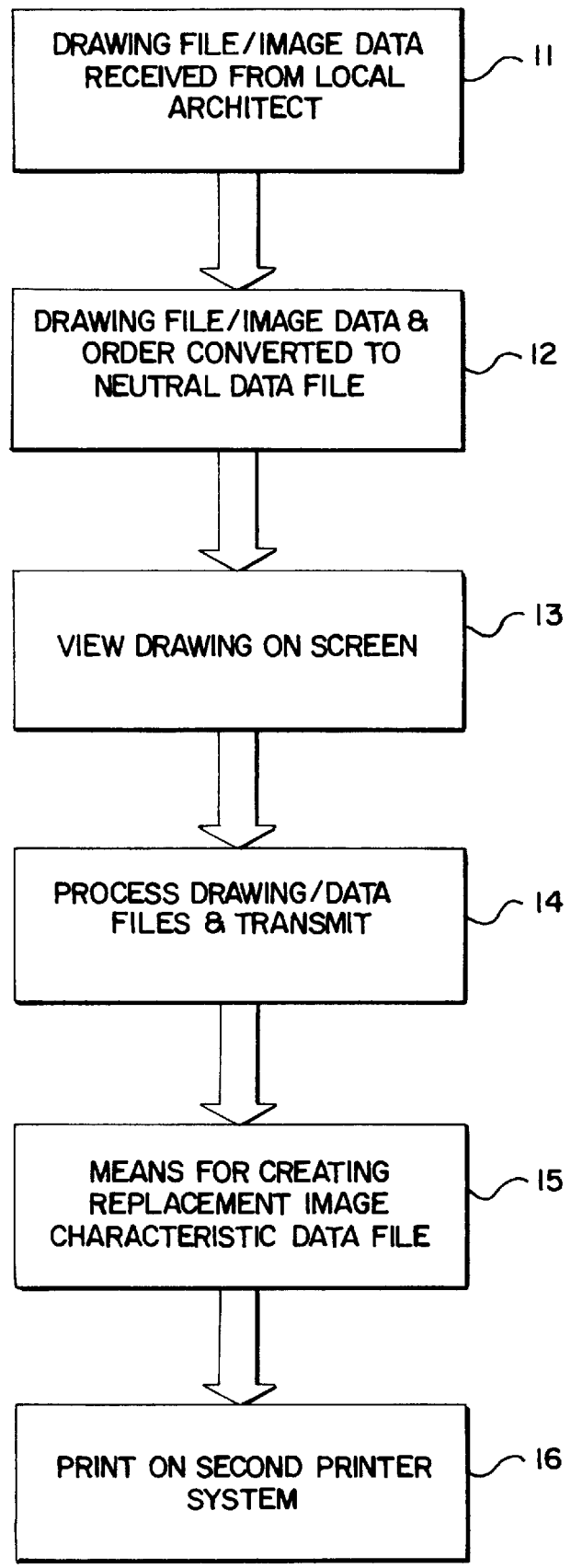
FIG. 2 illustrates the steps for carrying out the invention.
Figure 3:
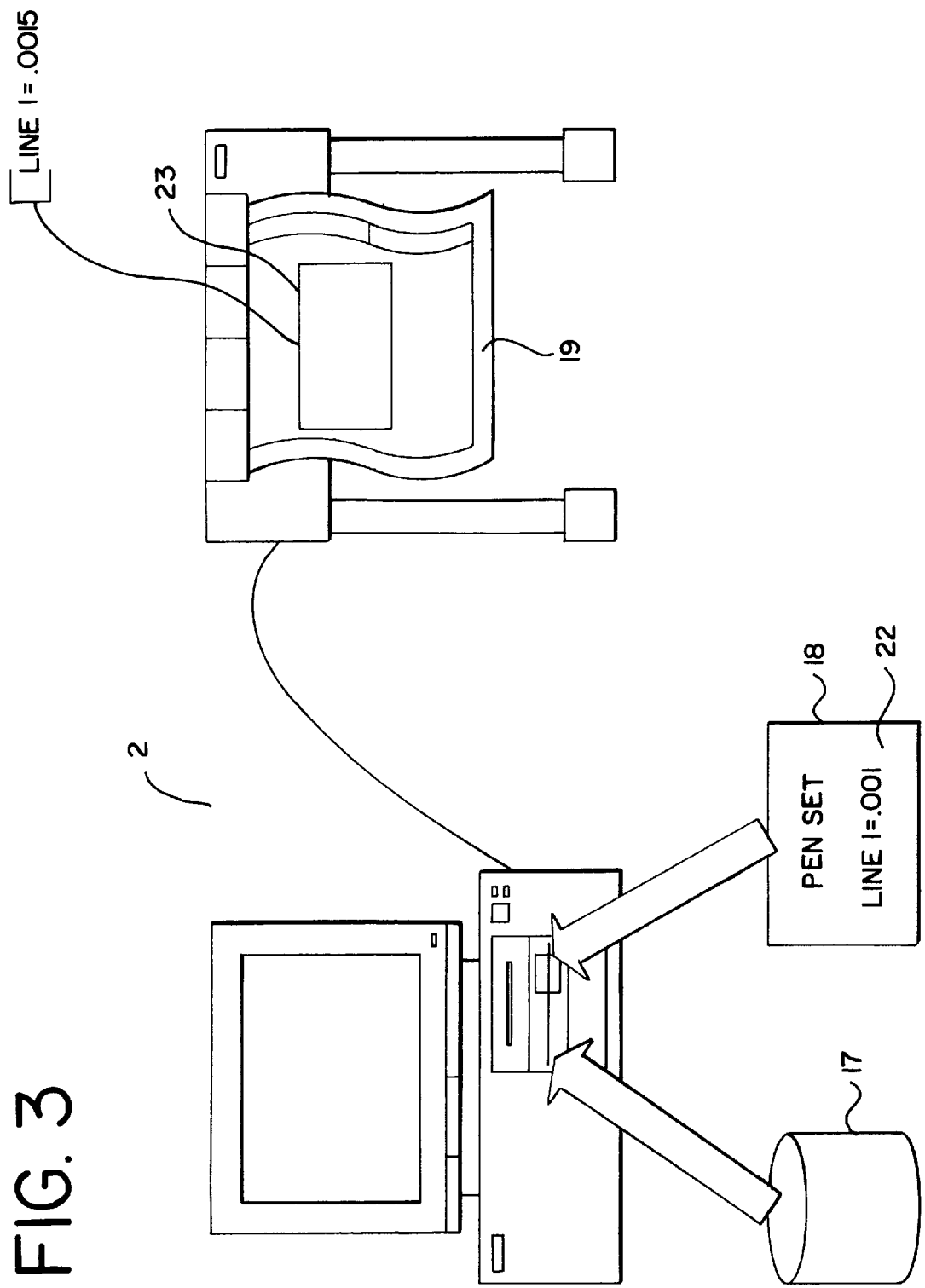
FIG. 3 illustrates a representation of a printer system and image files.

The invention allows the image represented by the neutral data file and the image characteristic data file 18 to be viewed on the computer screen 24, indicated by step 13 in FIG. 2. Thus, the reprographer is able to check the drawing and make desired adjustments. When satisfied with the image, the reprographer triggers the System to prepare the image for transmission to a receiving reprographer's location.

The reprographer then transmits the drawing (the neutral and image characteristic data files 18) to one or more remote location(s) via satellite 100, land data line 101, cellular data line (not shown), or another data transmission media, as shown in FIG. 1.

The files are received by the receiving reprographer, who has a second printer system 3 responsive to the neutral data file and the image characteristic data file 18. The second printer system 3 will produce a second print 20. Like the first printer system 2, the attribute on the second print 20 would have a second original actual value (not shown) corresponding to the original absolute value 22 provided to the second printer system 3 by the image characteristic data file 18. The second original actual value would likely be different than the first original actual value 23. Using the example above, if the image characteristic data file again specifies the particular line to be 0.001" thick, the second original actual value may measure 0.0005" thick. As seen in this example, the difference in actual line thicknesses on prints resulting from separate printing systems can be significant enough to be perceptible (i.e., 0.0015–0.0005=0.001"), which would be unacceptable for use in most applications.

Thus, to compensate for the difference in printer systems, upon receipt of the transmission, the system at each remote reprographer's location generates a replacement image characteristic file that is appropriate for the type of printing system selected by the remote reprographer. The invention accomplishes this by providing means for creating a replacement image characteristic data file. The means for creating a replacement image characteristic data file provides a second absolute value 33 instead of the original absolute value 22. Rather than producing a second original actual value (which is dissimilar to the first original actual value 5), using the second absolute value 33 on the second printer system 3 results in a second actual value that is substantially equivalent to the first actual value 23 from the first printer system 2.

In the preferred embodiment, the means for creating a replacement image characteristic data file are as follows. For clarity, the creating means will initially be described for an image characteristic data file 18 having only a single original absolute value 22. Referring to FIG. 5, the means for creating a replacement image characteristic data file, includes one device characteristic table 25,26 for each printer system 2,3. A device characteristic table 25,26 is a data table that correlates each of a plurality of absolute values 27,28 to a respective plurality of actual values 29,30 that would be produced by a particular printer system.

Specifically, a first device characteristic table 25 correlates a plurality of first absolute values 27 with a respective plurality of first actual values 29 resulting from producing a print using the first printer system 2. Similarly, a second device characteristic table 26 correlates a plurality of second absolute values 28 with a respective plurality of second actual values 30 resulting from producing a print using the second printer system 3.

The invention initially uses the first device characteristic table 25 to closely approximate the actual value that would be produced by using the first printer system 2, i.e., what a print made by the first printer system 2 actually would look like. To do this, the system has means for comparing the original absolute value 22 to the first device characteristic table 25 and for selecting from the plurality of first absolute values 27 a matching absolute value 30 that most closely matches the original absolute value 22. Upon identifying the matching absolute value 30, the system has means for identifying a first actual value 31 corresponding to the matching absolute value 30 in the first device characteristic table 25. The first actual value 31 thus represents the actual value that would result from the original absolute value 22 if the original absolute value 22 was actually printed using the first printer system 2.

Having identified the first actual value 31, the system then finds a second absolute value to use with the second printer system 3 that will produce a second actual value (not shown) substantially similar to the first actual value 31. The system accomplishes this using means for comparing the first actual value 31 to the second device characteristic table 26 and for selecting from the plurality of second actual values 30 a matching actual value 32 that most closely matches the first actual value 31. Using the matching value 32, the system has means for identifying the second absolute value 33 corresponding to the matching actual value 32. The now-identified second absolute value 33 is used to generate the second print 20, FIG. 1. Means for generating a replacement image characteristic data file are provided that substitutes the second absolute value 33 for the original absolute value 22 in the replacement image characteristic data file.

Typically, an image characteristic data file 18 has a plurality of original absolute values. Hence, the system will be further described for an image characteristic file 18 that provides a plurality of original absolute values specifying a plurality of attributes. The system is primarily the same as described above, except that a cross-reference table 35, as shown in FIG. 6, is provided for tracking the plurality of original absolute values and other corresponding values. The cross-reference table has a plurality of corresponding columns 36,37,38 including a first column 36 for storing the plurality of original absolute values.

When the reprographer directs the system to process a drawing image for transmission, step 14, FIG. 2, in addition to converting the drawing file to a neutral file, as described above, the system creates the cross-reference table 35, shown in FIG. 6. The system initially assigns the neutral file a unique identifier (not shown), which allows the system to accommodate and transmit multiple neutral files in one transmission by tracking which drawing attributes belong to which neutral file. The system reads each absolute value from the image characteristic data file 18 and stores it in the table 35 according to its unique identifier. As described below, the cross-reference table is used before the image is printed on the second printer system 3.

For each of the plurality of original absolute values 22a–22n, the invention includes means for comparing the original absolute value 22 to the first device characteristic table 25 and for selecting from the plurality of first absolute values 27 a matching absolute value 30 that most closely matches the original absolute value 22. For each of the plurality of original absolute values 22a–22n, the system includes means for identifying a first actual value 31 corresponding to the matching absolute value 30 in the first device characteristic table 25. The identifying means then stores the first actual value 31 in a second column 37 of the cross-reference table 35 in a row corresponding with the respective original absolute value 22a–22n. Thus, the second column 37 of the cross-reference table 35 provides close approximations of the actual measured attribute for each original absolute value 22a–22n that the first printer system 2 would produce if the print 19 was made on the first printer system 2.

For each of the plurality of original absolute values 22a–22n, the invention includes means for comparing the first actual value 31 to the second device characteristic table 26 and for selecting from the plurality of second actual values 30 a matching actual value 32 that most closely matches the first actual value 31. For each of the plurality of original absolute values 22a–22n, the invention provides means for identifying the second absolute value 33 corresponding to the matching actual value 32. The identifying means then stores the second absolute value 33 in a third column 38 of the cross-reference table 35.

The invention then uses the cross-reference table 35 to generate a replacement image characteristic data file, indicated by step 15 in FIG. 2. Specifically, the invention includes means for generating the replacement image characteristic data file in a format compatible with the printer system 3 selected by the receiving reprographer. The means for generating the replacement image characteristic data file uses the second absolute values 33a–33n contained in the third column 38 of the cross-reference table 35 in place of the original absolute values 22a–22n. Consequently, the print 20 resulting from the replacement image characteristic data file on the second printer system 3 will be substantially similar to the print 19 resulting from the first printer system 2.

While the replacement image characteristic file is prepared, the software also converts the neutral data file into a format compatible with the selected printer system 3. As indicated by step 16 in FIG. 2, the converted image files and the replacement image characteristic file are then sent to the second printer system to create the second print 20.

While the specific embodiment has been illustrated and described, numerous modifications come to mind without significantly departing from the spirit of the invention, and the scope of protection is only limited by the scope of the accompanying claims.

What I claim is:

1. A system for producing a plurality of substantially identical prints using a plurality of dissimilar printer systems, each of the substantially identical prints being generated from a neutral data file defining a print image and an image characteristic data file defining an attribute of the print image, the image characteristic file providing an original absolute value for specifying the attribute, the system comprising:

a first printer system responsive to the neutral data file and the image characteristic data file for producing a first print, the attribute on the first print having a first original actual value corresponding to the original absolute value provided to the first printer system by the image characteristic data file;

a second printer system responsive to the neutral data file and the image characteristic data file for producing a second print, the attribute on the second print having a second original actual value corresponding to the original absolute value provided to the second printer system by the image characteristic data file; and, means for creating a replacement image characteristic data file for generating a second substantially similar print using the second printer system, the replacement image characteristic data file providing, instead of the original absolute value, a second absolute value.

2. A system according to claim 1, wherein the means for creating a replacement image characteristic data file further comprises:

a first device characteristic table for correlating a plurality of first absolute values with a respective plurality of first actual values resulting from producing a print using the first printer system;

a second device characteristic table for correlating a plurality of second absolute value with a respective plurality of second actual values resulting from producing a print using the second printer system;

means for comparing the original absolute value contained in the image characteristic data file to the first device characteristic table and for selecting from the plurality of first absolute values a matching absolute value that most closely matches the original absolute value;

means for identifying a first actual value corresponding to the matching absolute value in the first device characteristic table;

means for comparing the first actual value to the second device characteristic table and for selecting from the plurality of second actual values a matching actual value that most closely matches the first actual value;

means for identifying the second absolute value corresponding to the matching actual value; and, means for generating the replacement image characteristic data file by substituting the second absolute value for the original absolute value in the replacement image characteristic data file.

3. A system according to claim 1, wherein the image characteristic file provides a plurality of original absolute values specifying a plurality of attributes.

4. A system according to claim 3, wherein the means for creating a replacement image characteristic data file further comprises:

a first device characteristic table for correlating a plurality of first absolute values with a respective plurality of first actual values resulting from producing a print using the first printer system;

a second device characteristic table for correlating a plurality of second absolute value with a respective plurality of second actual values resulting from producing a print using the second printer system;

a temporary data base table having a plurality of corresponding columns including a first column for storing the plurality of original absolute values;

for each of the plurality of original absolute values of the image characteristic data file, means for comparing the original absolute value to the first device characteristic table and for selecting from the plurality of first absolute values a matching absolute value that most closely matches the original absolute value;

for each of the plurality of original absolute values of the image characteristic data file, means for identifying a first actual value corresponding to the matching absolute value in the first device characteristic table and for storing the first actual value in a second column of the temporary data base table;

for each of the plurality of original absolute values of the image characteristic data file, means for comparing the first actual value to the second device characteristic table and selecting from the plurality of second actual values a matching actual value that most closely matches the first actual value;

for each of the plurality of original absolute values of the image characteristic data file, means for identifying the second absolute value corresponding to the matching actual value and for storing the second absolute value in a third column of the temporary data base table; and, means for generating the replacement image characteristic data file specific to the second printing system using the second absolute value corresponding to each of the plurality of original absolute values instead of the plurality of original absolute values.

5. A system for producing a plurality of substantially identical prints using a plurality of dissimilar printer systems, each of the substantially identical prints being generated from a neutral data file defining a print image and an image characteristic data file defining an attribute of the print image, the image characteristic file providing an original absolute value specifying the attribute, the system comprising:

a first printer system responsive to the neutral data file and the image characteristic data file for producing a first print, the attribute on the first print having a first original actual value corresponding to the original absolute value provided to the first printer system by the image characteristic data file;

a first device characteristic table for correlating a plurality of first absolute values with a respective plurality of first actual values resulting from producing a print using the first printer system;

a second printer system responsive to the neutral data file and the image characteristic data file for producing a second print, the attribute on the second print having a second original actual value corresponding to the original absolute value provided to the second printer system by the image characteristic data file;

a second device characteristic table for correlating a plurality of second absolute value with a respective plurality of second actual values resulting from producing a print using the second printer system;

means for comparing the original absolute value contained in the image characteristic data file to the first device characteristic table and selecting from the plurality of first absolute values a matching absolute value that most closely matches the original absolute value;

means for identifying a first actual value corresponding to the matching absolute value in the first device characteristic table;

means for comparing the first actual value to the second device characteristic table and selecting from the plurality of second actual values a matching actual value that most closely matches the first actual value; and, means for creating a replacement image characteristic data file for generating a second substantially similar print using the second printer system, the replacement image characteristic data file providing, instead of the original absolute value, a second absolute value corresponding to the matching actual value in the second device characteristic table.

6. A method for producing a plurality of substantially identical prints using a plurality of dissimilar printer systems, each of the substantially identical prints being generated from a neutral data file defining a print image and an image characteristic data file defining an attribute of the print image, the image characteristic file providing an original absolute value for specifying the attribute, the method involving the following steps:

providing a first printer system responsive to the neutral data file and the image characteristic data file for producing a first print, the attribute on the first print having a first original actual value corresponding to the original absolute value provided to the first printer system by the image characteristic data file;

providing a second printer system responsive to the neutral data file and the image characteristic data file for producing a second print, the attribute on the second print having a second original actual value corresponding to the original absolute value provided to the second printer system by the image characteristic data file; and, creating a replacement image characteristic data file for generating a second substantially similar print using the second printer system, the replacement image characteristic data file providing, instead of the original absolute value, a second absolute value.

7. A method according to claim 6, wherein the step of creating a replacement image characteristic data file requires the following further steps:

providing a first device characteristic table for correlating a plurality of first absolute values with a respective plurality of first actual values resulting from producing a print using the first printer system;

providing a second device characteristic table for correlating a plurality of second absolute value with a respective plurality of second actual values resulting from producing a print using the second printer system;

comparing the original absolute value contained in the image characteristic data file to the first device characteristic table and for selecting from the plurality of first absolute values a matching absolute value that most closely matches the original absolute value;

identifying a first actual value corresponding to the matching absolute value in the first device characteristic table;

comparing the first actual value to the second device characteristic table and for selecting from the plurality of second actual values a matching actual value that most closely matches the first actual value;

identifying the second absolute value corresponding to the matching actual value; and, generating the replacement image characteristic data file by substituting the second absolute value for the original absolute value in the replacement image characteristic data file.

* * * * *